United States Patent [19]

Wiseman

[11] Patent Number: 5,068,275
[45] Date of Patent: Nov. 26, 1991

[54] PLASTICIZED HYDROGENATED NITRILE RUBBER

[75] Inventor: William A. Wiseman, Sarnia, Canada

[73] Assignee: Polysar Rubber Corporation, Sarnia, Canada

[21] Appl. No.: 593,743

[22] Filed: Oct. 5, 1990

Related U.S. Application Data

[63] Continuation-in-part of Ser. No. 473,437, Feb. 1, 1990, abandoned.

[51] Int. Cl.$^5$ .............................................. C08K 5/11
[52] U.S. Cl. ................................... 524/314; 524/565; 525/387
[58] Field of Search ............................... 524/314, 565

[56] References Cited

U.S. PATENT DOCUMENTS

| 2,449,058 | 9/1948 | Coes | 524/314 |
| 4,192,828 | 3/1980 | Witschard | 525/83 |
| 4,464,515 | 8/1984 | Rempel et al. | 525/338 |
| 4,631,315 | 12/1986 | Buding et al. | 525/338 |
| 4,822,654 | 4/1989 | Takamura et al. | 524/308 |
| 4,826,925 | 5/1989 | Ozawa et al. | 525/331 |

FOREIGN PATENT DOCUMENTS 447046 3/1948 Canada ............................ 524/314

*Primary Examiner*—Joseph L. Schofer
*Assistant Examiner*—Mark Sweet
*Attorney, Agent, or Firm*—Stevens, Davis, Miller & Mosher

[57] ABSTRACT

This invention provides a plasticized hydrogenated nitrile composition. The composition of the present invention must contain a peroxide vulcanization system and a specific type of plasticizer. Vulcanizates according to the invention have superior resistance to hot air ageing in comparison to conventionally plasticized compositions, and most surprisingly, in comparison to non-plasticized compositions. The compositions of the present invention may be used to prepare hoses, seals, gaskets and other rubber goods.

4 Claims, No Drawings

PLASTICIZED HYDROGENATED NITRILE RUBBER

This is a continuation-in-part of application Ser. No. 473,437, filed Feb. 1, 1990, now abandoned.

FIELD OF THE INVENTION

This invention relates to a composition comprising a hydrogenated nitrile rubber, a peroxide vulcanization system and a specific plasticizer.

BACKGROUND OF THE INVENTION

In general, hydrogenated nitrile rubber is produced by the hydrogenation of the carbon-carbon double bonds contained in nitrile rubber. Vulcanizates of hydrogenated nitrile rubber are known to have excellent resistance to heat, oil and ozone.

Plasticizers are sometimes used in hydrogenated nitrile rubber to modify the processing characteristics or to improve the low temperature properties of the vulcanizates. However, it is generally acknowledged that the use of plasticizer in hydrogenated nitrile rubber compositions produces an undesirable side effect, namely a reduction in resistance to hot air ageing. Thus conventionally, heat resistant plasticizers with low volatility such as low molecular weight trimellitate compounds are generally preferred in order to minimize the impairment of resistance to hot air ageing.

Heretofore, there has not been provided a plasticized, hydrogenated nitrile rubber composition having improved low temperature properties and improved resistance to hot air ageing, and it is an object of this invention to provide such a composition.

SUMMARY OF THE INVENTION

The present invention provides a vulcanized rubber composition having improved low temperature characteristics and improved resistance to hot air ageing, said composition containing as the only rubbery polymer hydrogenated nitrile rubber and further comprising a peroxide vulcanization system and a polymeric plasticizer having a weight average molecular weight of from about 600 to about 1500 and being a mixed dibasic acid polyester polymeric plasticizer obtained by the reaction of a dicarboxylic acid with a $C_1$ to $C_{12}$ alcohol.

The vulcanized rubber compositions of the present invention may be prepared by one of mixing the polymeric plasticizer with the hydrogenated nitrile rubber and other components in the normal compounding process or by mixing the polymeric plasticizer with the hydrogenated nitrile rubber in solution in a solvent, coagulating the mixture by contact with steam and hot water and recovering the rubber-plasticizer mixture which is then used in the normal compounding process.

DETAILED DESCRIPTION

Nitrile rubber is a well known article of commerce which is typically prepared by the free radical initiated, emulsion polymerization of a $C_{3\text{ to }5}$ $\alpha,\beta$-unsaturated nitrile and a $C_{4\text{ to }6}$ conjugated diene. Nitrile rubber has carbon-carbon double bond unsaturation resulting from the incorporation of the conjugated diene units. Acrylonitrile-butadiene rubber is a commercially available example of nitrile rubber.

As used herein, the term "hydrogenated nitrile rubber" refers to the product which is obtained by hydrogenating the carbon-carbon unsaturation of nitrile rubber until the remaining level of double bond unsaturation is less than 10 mole percent. Preferred hydrogenated nitrile rubber has less than 5 mole per cent double bond unsaturation and is most preferably prepared by hydrogenating an acrylonitrile-butadiene rubber. In particular, the preferred acrylonitrile-butadiene rubber contains (prior to hydrogenation) 18 to 50 weight percent acrylonitrile units (especially from 25 to 45 weight percent acrylonitrile units) with the balance to 100 weight percent consisting of butadiene units.

Hydrogenated nitrile rubber may be produced by the catalytic hydrogenation of a solution of nitrile rubber. Hydrido tetrakis (triphenylphosphine) rhodium (I), for example, is a suitable hydrogenation catalyst for nitrile rubber. Detailed descriptions of nitrile rubber hydrogenation processes are provided in U.S. Pat. Nos. 4,464,515 and 4,631,315, the disclosures of which are incorporated herein by reference.

Hydrogenated nitrile rubber is commercially available under the trademarks THERBAN ® (from Bayer, of Leverkusen, West Germany), ZETPOL ® (from Nippon Zeon, Japan) and TORNAC ® (produced by Polysar, in Orange Tex., U.S.A.).

Hydrogenated nitrile rubber can be vulcanized using either of the well known peroxide or sulfur vulcanization systems. However, the present invention is restricted to peroxide vulcanization systems because the enhancement of resistance to hot air ageing which distinguishes the present compositions is not obtained with a sulfur vulcanization system.

The term "peroxide vulcanization system" is meant to refer to its conventional meaning in the rubber industry. Peroxide vulcanization systems consist of a suitable organic peroxide, but may further include an optional amount of a coagent.

Any of the organic peroxides which are used to prepare rubber vulcanizates may be employed in the present invention. Specific examples of organic peroxides include dicumyl peroxide, t-butyl hydroperoxide, de-t-butyl peroxide, benzoyl peroxide and 2,4 dichlorobenzoyl peroxide. The amount of peroxide used is normally from 2 to 15 "parts by weight per 100 parts by weight" of hydrogenated nitrile rubber (note: for convenience, the immediately preceding phrase in quotations is sometimes hereafter abbreviated to p.h.r.).

The optimal level of peroxide may be readily established by a rubber compounder using a few small scale experiments.

The coagent, if employed, is one which is conventionally used in combination with an organic peroxide. Such coagents are multifunctional materials (e.g. monomers, oligomers or low molecular weight polymers) which participate in the vulcanization process. Specific examples of coagents include poly(1,3 butadiene), polyfunctional acrylates and polyfunctional vinyl aromatics such as divinylbenzene. It is preferred to use coagent in an amount between 1 and 7 p.h.r.

The compositions of this invention are plasticized. The use of plasticizers to modify the processing characteristics or to improve the low temperature characteristics of conventional nitrile rubber is well known to the skilled rubber compounder. Low molecular weight, polar additives such as phthalates (especially dioctyl phthalate or dibutyl phthalate), epoxidized soya bean oil, linear trimellitates, theoethers and coumarone-indene resins are specific examples of commonly used nitrile rubber plasticizers. However, it is widely recognized that the use of these plasticizers also causes a reduction in hot air ageing resistance (i.e. "plasticized" compositions have a larger percentage decrease in physical properties, especially elongation, after hot air ageing in comparison to non-plasticized compositions).

In contrast, I have discovered peroxide vulcanized, hydrogenated nitrile rubber compositions which have superior physical property retention after hot air ageing in comparison to non-plasticized compositions.

The only plasticizer type which is suitable for use in this invention is a low molecular weight, mixed dibasic acid polyester polymeric plasticizer.

Such plasticizers are the reaction product of a dicarboxylic acid and a $C_1$ to $C_{12}$ alcohol. Thus, the mixed dibasic acid polyester polymeric plasticizer employed in the present invention must be prepared from a dicarboxylic acid (i.e. a carboxylic acid having two COOH functional groups). Examples of such dicarboxylic acids include $HOOC-(CH_2)_2-COOH$, $HOOC-(CH_2)_8-COOH$ and $HOOC-(CH_2)_{12}-COOH$.

Polyester plasticizers which are synthesized from monocarboxylic acids are not suitable for use in the present invention.

The conventional reaction of the above described dibasic carboxylic acid with an alcohol provides the plasticizers which are employed in the present invention. Suitable alcohols contain from 1 to 12 carbon atoms, with $C_6$, $C_8$ and $C_{10}$ alcohols being preferred.

The plasticizer preferably has a weight average molecular weight ("$M_w$") between 600 and 1500, with a $M_w$ from 700 to 1100 being most preferred. Two commercially available examples of this plasticizer are sold by C. P. Hall Company of Chicago, U.S.A. under the trademark PARAPLEX, namely PARAPLEX G-30 (a liquid having a $M_w$ of approximately 800 and a viscosity of approximately 1400 centipoise at 25° C.) and PARAPLEX G-31 (a liquid having a $M_w$ of about 1000 and a viscosity of about 5500 centipoise at 25° C.). The plasticizer is most preferably used in an amount between 10 and 30 p.h.r.

The compositions of the present invention may also include other ingredients which are normally contained in conventional rubber compounds, such as antioxidants, stabilizers, processing aids, reinforcing fillers and non-reinforcing fillers.

The present compositions may be readily prepared by mixing techniques which are well known to skilled rubber compounders. The use of a Banbury-type mixer or a mill mixer is preferred.

Vulcanizates prepared from the present compositions may be suitably used to fabricate a wide variety of rubber products including seals, hoses, gaskets and mechanical goods. Such vulcanizates may be readily obtained by heating the composition to a temperature above the activation temperature of the peroxide vulcanization system (as will be readily understood by those skilled in the art of vulcanization).

Further details of this invention are provided by the following non-limiting examples, in which all references to "parts" are to be understood as meaning "parts by weight".

EXAMPLE 1

This example illustrates inventive and comparative hydrogenated nitrile rubber compositions and the properties of the vulcanizates.

The comparative composition of Experiment 4 was prepared without plasticizer, while the comparative composition of Experiment 1 was prepared with a conventional trimellitate plasticizer.

The compositions of Experiments 1-4 were all prepared with a hydrogenated nitrile rubber having less than 1 mole percent carbon-carbon double bond unsaturation (which rubber was prepared from an acrylonitrile-butadiene rubber having 38 weight percent acrylonitrile units) and the other compounding ingredients which are listed in Table 1.

The compositions were vulcanized for 10 minutes at 180° C. Physical properties of the unaged vulcanizates were measured according to the standard test procedures of ASTM D-412, and the test results are shown in Table 1.

The vulcanizates were also subjected to a hot air ageing test (ASTM D-573), under the conditions (time and temperature) noted in Table 1. Ultimate elongation (also referred to as "elongation") measurements were completed on the hot air aged vulcanizates. The decrease in the elongation property of the aged vulcanizates ("Delta elongation") was calculated as follows:

$$\text{Delta elongation} = \frac{\text{aged elongation} - \text{unaged elongation}}{\text{unaged elongation}} \times 100\%$$

The results shown in Table 1 illustrate that the resistance to hot air ageing of the vulcanizate prepared with the conventional trimellitate plasticizer, as measured by retention of elongation (i.e. the elongation result) is inferior to that of the non-plasticized vulcanizate. The results of Table 1 further illustrate that the resistance to hot air ageing of the inventive vulcanizates of Experiments 2 and 3 is superior to that of the other vulcanizates.

Table 1 also contains data which illustrate the improved low temperature properties of the plasticized vulcanizates (i.e. inventive Experiments 2 and 3, and comparative Experiment 1) in comparison to the non-plasticized vulcanizate of Experiment 4, as determined according to ASTM D-1329 ("TR test").

TABLE 1

| Experiment | 1-C | 2 | 3 | 4-C |
|---|---|---|---|---|
| Ingredient | | | | |
| Hydrogenated nitrile rubber | 100 | 100 | 100 | 100 |
| Zinc oxide | 5 | 5 | 5 | 5 |
| Stearic acid | 1 | 1 | 1 | 1 |
| Magnesium oxide | 10 | 10 | 10 | 10 |
| Zinc 2-mercaptotoluimidazole | 0.4 | 0.4 | 0.4 | 0.4 |
| Diphenylamine antioxidant | 1.1 | 1.1 | 1.1 | 1.1 |
| Carbon black[-1] | 15 | 15 | 15 | 15 |
| Carbon black[-2] | 25 | 25 | 25 | 25 |
| Trimellitate plasticizer | 22.5 | — | — | — |
| Plasticizer 1[-3] | — | 22.5 | — | — |
| Plasticizer 2[-4] | — | — | 22.5 | — |
| 2,5-dimethyl (t-butyl peroxy)-hexane[-5] | 10 | 10 | 10 | 10 |
| Coagent[-6] | 6.5 | 6.5 | 6.5 | 6.5 |
| Physical Properties (Unaged Vulcanizates) | | | | |
| Hardness (Shore A) | 63 | 62 | 63 | 70 |
| 100% Modulus (MPa) | 3.0 | 3.1 | 3.2 | 4.4 |
| 300% Modulus (MPa) | 14.1 | 14.4 | 14.6 | 17.5 |
| Tensile (MPa) | 16.5 | 17.2 | 17.4 | 18.7 |
| Elongation (%) | 365 | 360 | 365 | 335 |
| Hot Air Ageing (70 hours at 150°) | | | | |
| Elongation (%) | 315 | 345 | 355 | 295 |
| Delta Elongation (%) | −14 | −4 | −3 | −12 |
| Hot Air Ageing (168 hours at 150° C.) | | | | |

TABLE 1-continued

| Experiment | 1-C | 2 | 3 | 4-C |
|---|---|---|---|---|
| Elongation (%) | 285 | 335 | 340 | 285 |
| Delta Elongation (%) | −22 | −7 | −7 | −15 |
| Hot Air Ageing (70 hours at 165° C.) | | | | |
| Elongation (%) | 300 | 330 | 345 | 280 |
| Delta Elongation (%) | −18 | −8 | −5 | −16 |
| TR Test (°C.) (100% Elongation) | | | | |
| TR10 | | −25 | −24 | −23 | −19 |
| TR30 | | −19 | −18 | −18 | −15 |
| TR50 | | −16 | −15 | −15 | −12 |
| TR70 | | −12 | −11 | −11 | −8 |

NOTES
-C comparative
-1 ASTM designation N550
-2 ASTM designation N990
-3 mixed dibasic acid polyester, $M_w$ ca 800 (sold as PARAPLEX G-30)
-4 mixed dibasic acid polyester, $M_w$ ca 1000 (sold as PARAPLEX G-31)
-5 reported to be 45% active, 55% inert carrier
-6 low molecular weight, poly(1,2 butadiene), sold under the tradename Ricon 153-D

What is claimed is:

1. A vulcanized rubber composition having improved low temperature characteristics and improved resistance to hot air ageing, said composition containing as the only rubbery polymer hydrogenated nitrile rubber and further comprising a peroxide vulcanization system containing from 2 to 14 parts by weight of organic peroxide per 100 parts by weight of said hydrogenated nitrile rubber and from 10 to 30 parts by weight per 100 parts by weight of said hydrogenated nitrile rubber of a polymeric plasticizer having a weight average molecular weight of from about 600 to about 1500 and being a mixed dibasic acid polyester polymeric plasticizer obtained by the reaction of a dicarboxylic acid with a $C_1$ to $C_{12}$ alcohol.

2. The composition of claim 1 wherein said peroxide vulcanization system further contains a coagent.

3. The composition of claim 1 wherein said hydrogenated nitrile rubber contains less than 5 mole percent of carbon-carbon double bond unsaturation.

4. The composition of claim 1 wherein said hydrogenated nitrile rubber is produced from an acrylonitrile-butadiene rubber which, prior to hydrogenation, contains from 25 to 45 weight percent of acrylonitrile units.

* * * * *